United States Patent Office 2,757,104

Patented July 31, 1956

2,757,104

PROCESS OF FORMING PRECISION RESISTOR

Ronald Bruce Howes, Colorado Springs, Colo., assignor to Metalholm Engineering Corporation, a corporation of Minnesota No Drawing. Application April 15, 1953, Serial No. 349,102

3 Claims. (Cl. 117—217)

This invention relates to the production of electrical resistors which include electrically conductive films having precise, predetermined and predictable electrical characteristics.

In one important aspect of the invention, a method is provided for the formation of a thin conductive film of predetermined resistance upon and securely bound to a non-conductive carrier as, for example, in the production of precision resistors for use in electronic circuits. In other applications, resistive films produced in accordance with the invention may be employed as resistors in printed circuits or as resistance elements for electrical heating units wherein the film conforms to the contours of the surface of a non-conductive carrier.

Electronic apparatus is being employed in a wide variety of applications and the circuits and components thereof must be varied to meet the specific requirements in each instance. The environment in which the apparatus must operate, as well as the functions which it is designed to perform, result in a wide variety of specifications for the circuit components, and the exacting and reliable performance of the equipment depends upon the characteristics of the component elements from which it is constructed.

The particular contribution of the invention herein described to the quality and performance of electronic apparatus is a method for the production of a homogeneous resistive film which method possesses the important virtue of controllability whereby the exact predetermined electrical characteristics of the film may be produced, and, of equal importance, may be faithfully duplicated in mass production.

In its essentials, the process involves the production of the final film by chemical substitution for a portion of the metal of a primary film of one or more other metals followed, if desired, by further chemical or heat treatment to produce exactly the desired characteristics in the final film.

Generally, the film must be supported upon a non-conductive carrier, preferably a ceramic material, such as porcelain, glass, or steatite. Other supporting materials having the necessary chemical, electrical, and physical characteristics may be used. The materials must, of course, be capable of withstanding the action of the several chemicals used in the process and the changes in temperature to which the materials are subjected both during the process of formation of the film and during use of the finished article. The shape of the carrier is such as to conform to the requirements of the finished product.

The first step in the process, without regard to the constitution of the final resistive film, is to thoroughly clean the surfaces to which the film is to be applied. Since the quality of the final product is dependent upon the thoroughness of the initial cleaning of the substratum surface, great care should be taken to remove all foreign substances completely. Depending upon the nature of the foreign matter to be removed, a suitable cleaning process may include heating to approximately 1000° F. for approximately 30 minutes in a dust-free atmosphere, or a wet chemical cleaning process may be employed. A number of alkaline non-soap detergents are commercially available for this purpose. A suitable cleaning solution may be prepared by dissolving 15 grams of the commercial cleaning compound sold under the trademark "Alconox" in one gallon of water. Trisodium phosphate solution may be used. A so-called chemically cleaned surface may generally be produced by boiling the carrier bodies in such a surface active detergent solution for approximately five minutes and rinsing with water at least the final rinse being with distilled water.

The cleaned surfaces are then preferably sensitized by means of an acid stannous chloride solution which may have the following composition:

| | | |
|---|---|---|
| Stannous chloride | grams | 100 |
| Hydrochloric acid, reagent grade | c. c. | 500 |
| Distilled water | c. c. | 4000 |

This solution may be applied to the surface to be sensitized in any suitable manner for a period of about one minute. The sensitizing solution should then be removed by thoroughly rinsing the surfaces with distilled water after which the surfaces should be protected to keep them clean as, for example, by keeping them covered with water.

It may be noted that sensitization of the surface to which the film is to be bonded is not an indispensable part of the process as a primary film of metal may be deposited upon an unsensitized surface. However, for precision results where the primary film is to be chemically deposited from a reducing solution, sensitization is recommended. The purpose of this preliminary surface treatment is to facilitate the secure and uniform deposition of the metal of the primary film from a reducing solution as hereinafter described.

In carrying out the process of the invention, a primary film comprising a metal which is higher in the electromotive series than the metal or metals to be added to, or substituted for, the metal of the primary film, is first formed upon the cleaned and sensitized surface. The primary film may consist of a single metal or may be in the nature of an alloy of two or more metals. In addition to chemical deposition, it may be formed upon the carrier by spraying, sputtering, evaporation and condensation, or other similar process which forms a film layer of somewhat discrete physical composition in the nature of a field of small particles. Preferably, but not necessarily, a metal used for the primary deposit will be one which possesses the characteristics desired as a constituent of the final film. A further requirement of the metal or metals used in the primary film and the process for the formation thereof is ability to securely bond to the surface of the non-conductive carrier.

In addition to the foregoing, the metals employed in the production of the primary film by chemical deposition must form salts which are easily reduceable and deposited from solution in free crystalline or similar state upon the surface of the non-conductive carrier. Metals which meet these specifications include the following:

Gold
Platinum
Silver
Palladium
Copper

These metals may be deposited upon the desired surfaces from suitable reducing solutions such as those specified in the examples hereinafter given.

The reducing solutions containing the primary film metal ions may be applied to the carrier surfaces by any suitable means. Ordinarily, the surfaces will be immersed in the solution, agitation being provided. For example, in the manufacture of resistors, the supporting bodies may be tumbled in a barrel containing the solution. The barrel tumbling technique results in a less uniform film than isolated immersion, but the films are usable for most purposes.

The nature and thickness of the primary film is a function of the time of immersion, concentration of solution, and other factors. Ordinarily, the operation is carried out at room temperatures, it being important to maintain the solution at a predetermined temperature only for purposes of control in duplicating deposits in defferent batches. If desired, the process of deposition of the primary film may be repeated to form the desired thickness of film. While not critical, the time of immersion should not be unduly extended in view of the formation of metallic oxides in the reducing solution which may result in undesired occlusion of the oxide within the film. Ordinarily, exposure of the non-conductive surfaces to the solution for not more than about eight minutes is satisfactory. The minimum exposure time is that which produces a film having sufficient thickness and conductivity for the purposes of the balance of the process and the ultimate resistance characteristics.

Following final deposition of the primary film, the film is permitted to dry. If it is desired to accelerate this process, baking at, say, 120° F. may be employed. Drying is not indispensable to the process, the next step of which consists in the further treatment of the primary film with aqueous solutions, but it is desirable to avoid dilution of the solutions and otherwise upset the conditions necessary for the precise control of the chemical substitutions which directly affect the resistance characteristics of the final film. Drying is also essential if the primary film is to be stabilized and its bonding to the carrier enhanced by baking the primary film at a temperature between about 500° F. and 1500° F. Stabilization of the primary film in this manner is also a permissive and not indispensable step in the process.

After completion of the primary film, it should be protected from oxidation or other form of corrosion and from mechanical damage. Storage under distilled water is recommended.

The final composition of the final resistive film may include oxides of the metallic constituents in addition to the metals themselves. As above stated, the entire process of the invention is geared to the ultimate desired result. In precision resistors, for example, the temperature coefficient of resistance and the voltage coefficient are desirably zero or as close to zero as is possible of achievement. The process of the invention is calculated to admit of careful control at every step whereby these desired results may be achieved.

One of the essential factors to control is the metallic constitution of the final resistive film. This may be accomplished in accordance with the invention by replacing any desired proportion of the metal of the primary film by suitable corresponding proportions of a suitable metal or metals. For example, if the primary film is silver, a portion of the silver may be replaced by, for example, gold, platinum, or palladium, or by suitable proportions of more than one of these metals.

The metallic constitution of the final resistive film is determined by the composition of the secondary film bath and the conditions of exposure of the primary film thereto. The purpose of the further treatment of the primary metallic film is to produce a film field composed of predetermined proportions of two or more metals, this being achieved by the controlled chemical substitution of metal ions from the secondary film bath for a more or less substantial portion of the metal or metals of the primary film.

The secondary film bath may be a solution or sol of a metal or metals which are lower (less active) in the electromotive series than a metal of the primary film. In order to achieve a particular predetermined result, the temperature, concentration, pH, and purity of the bath must be carefully controlled. The nature of the particular metallic compounds used will also have a bearing upon the exchange. The condition of the primary film, the length of time of exposure to the bath, and the nature and extent of agitation of the solution are also factors which must be carefully controlled for precision results.

The primary film may be either wet or dry at the inception of the secondary film bath treatment. If precision is important, the primary film is preferably dry and stabilized, in the manner above described, or, if wet, it should be uniformly wet so that the resulting dilution of the secondary film bath will be uniform throughout the primary film surface. Exposure of the primary film to the bath may be conveniently accomplished by immersion of the carrier with the primary film in the bath, or the solution may be sprayed, brushed, or laved upon the primary film surfaces. If desired, the film may be subjected to several consecutive exposures to baths of the same or differing compositions in order to achieve the desired results. Also, if desired, a second primary film may be deposited upon the alloy field produced by the chemical substitution process described, and this second primary film in turn treated with substitution baths.

Displacement of the metal ions of the substitution bath by the chemically deposited metal of the primary film is essentially an atomic exchange which produces an alloy field comprising a multiplicity of small crystal particles. If a fine-textured film is desired, as, for example, for the ultimate production of a resistance element having a low temperature coefficient by virtue of further treatment hereinafter described, the chemical substitution process should be rapid and of short duration. This may be accomplished by the use of clean solutions, elevated temperatures, and by the proper adjustment of other factors. In addition to the adjustment of the factors mentioned above, the substitution may be retarded by treating the primary film with a glycol, such as glycerol, or by a higher alcohol which will not attack the primary film, but which is miscible with the bath and thus will not entirely prevent necessary contact with the metal ions of the substitution bath.

When the desired substitution has been completed, the resistive film may be air or oven dried and then stabilized, as by baking at 300° F. for a period of about 15 minutes.

Metallic films thus formed exhibit particular resistance characteristics which are desirable for many applications. However, if a resistive film having a temperature coefficient of resistance approaching zero is desired, further treatment is necessary since, as a practical matter, all metals have positive temperature coefficients. Such further treatment may consist of baking at about 800 to 1500° F. for a period of sufficient duration to produce the desired degree of oxidation of the alloy field. In general, the oxides of the metals generally employed in the production of resistor films are semi-conductors having negative coefficients of resistance. Since the oxide of palladium is quite readily formed by the heat treatment described and exhibits a comparatively high negative coefficient, it is frequently desirable to incorporate this metal in the alloy field of the final film. Following the procedures described above to produce a fine textured metallic film, a highly uniform, and stable film having substantially a zero temperature coefficient may be produced.

Following completion of the desired final film resistor, a protective coating may be applied and provision made for terminals for connection of the resistor into a circuit. Precision resistors may be calibrated and marked following known procedures.

The following specific examples exemplify the process of the invention above described:

*Example 1*

To produce a precision resistor having a silver-palladium film, the following procedure may be employed:

A suitable number of ceramic cores 1 in. long by 9/32 in. in diameter are thoroughly cleaned by chemical or thermal procedures as above outlined. Following thorough rinsing with water, the surfaces of the cores are sensitized in the manner above described and the cores are then ready for the primary deposit.

A silver film is chemically deposited upon the sensitized surfaces of the cores by immersing the cores for a period of approximately six minutes in a silvering bath at room temperature prepared as follows:

Add enough water to 90 grams of dextrose and 40 c. c. of nitric acid to make up one liter and boil for five minutes. To this solution, add 175 c. c. of ethyl alcohol and shake.

A second solution is prepared by adding a 2.5% solution of potassium hydroxide to an equal volume of a 5% solution of silver nitrate. To this solution is added sufficient ammonium hydroxide to just dissolve the precipitate, then sufficient 5% silver nitrate solution is added to just produce a light brown discoloration.

The sensitized cores are then immersed in the second solution and the first solution is added in a ratio of one part to four parts of the second solution. This mixture results in the reduction and deposition of the silver upon the surfaces of the core. The cores with the primary films of silver thereon should then be rinsed with water and air or oven dried.

The cores are then immersed in a palladium substitution bath consisting of one part of 10% palladium chloride solution and fifty parts of distilled water. Immersion of the cores in this solution for about 30 seconds, the temperature of the solution being about 80° F., produces an alloy field film of silver and palladium which, when rinsed, dried, and stabilized by baking for about fifteen minutes at 300° F. will have a resistance of approximately 80 to 90 ohms.

To complete the resistor, the ends may be silvered by the application of a suitable colloidal silver paste or paint, applying terminal caps to the silvered ends of the cores, applying a suitable protective coating over the resistive film, calibrating the film to a predetermined value, as by spiraling, applying a protective outer coating and coding the finished unit.

*Example 2*

To produce a resistor having a more highly resistant film and a lower temperature coefficient of resistance, the cores of Example 1 having the silver-palladium films formed upon them are baked in air at approximately 1000° F. This heat treatment results in the formation of more or less oxide upon the surfaces of the alloy field, depending upon the temperature and duration of the treatment, with consequent reduction in conductivity and temperature coefficient characteristics of the film.

*Example 3*

A silver-gold-paladium film may be prepared by treating the primary silver film prepared as described for Example 1 with a solution prepared by adding sufficient water to 2 c. c. of 10% gold chloride solution and 2 c. c. of 10% palladium chloride solution to make up a volume of one liter. Immersion of the silvered surfaces for about 90 seconds at 70° F. produces the tertiary alloy field having particular useful electrical characteristics and which may be heat treated in the manner described in Example 2 to lower the resistance and temperature coefficient of the film.

*Example 4*

A copper primary film may be formed upon the cleaned and sensitized non-conductive carrier using the following procedure:

Prepare a first solution by dissolving 30 grams of copper acetate in one liter of water and adding sufficient ammonia to redissolve the precipitate just formed. A second solution consists of a 42% solution of hydrazine sulphate. Mix one part of the second solution with 10 parts of the first solution and pour the resulting mixture over the heated sensitized surface. The copper film thus formed should be rinsed with water and may then be treated with a substitution bath containing metallic ions lower in the electrochemical series than copper to produce a desired alloy film.

In the foregoing examples, unless otherwise specified, solution concentrations are by weight.

From the foregoing description and specific examples of the invention, it will be apparent that the noble metals are preferably used at least in the substitution baths in the formation of the final resistive films. In addition to the essential effect of their electromotive potentials, which account for the chemical substitutions under the procedures described, these metals oxidize when exposed to the atmosphere only negligibly except at elevated temperatures. This characteristic is desirable from the standpoint of stability of the electrically conductive film.

The invention herein described may be employed with advantage in the formation, in situ, of resistors in so-called printed circuits. Following photolithographic procedures, primary film deposits of silver, for example, which may be portions of the integrated circuit, are treated with substitution baths of predetermined constitution, temperature, concentration, etc., to convert the primary silver film to the particular alloys giving the desired resistance characteristics. The alloy films thus formed may be subjected to controlled oxidation by radiant or oven heating, as described above, to complete development of the desired resistance characteristics.

Invention is claimed as follows:

1. The process of forming a precision film of predetermined resistivity upon a non-conductive carrier which comprises forming upon said carrier a primary film comprising a field of small particles of silver, removing a portion of said silver film and simultaneously substituting therefor particles of at least one metal having an electromotive potential lower than that of silver and whose oxide has a relatively high negative temperature coefficient of resistance by applying to said primary film a substitution bath containing a solute constituent of said one metal whereby to convert said primary film into an alloy field of predetermined composition, and thereafter heating said film to oxidize surface elements of said alloy field to raise the resistivity of said alloy field to a predetermined value whereat its temperature coefficient of resistance is substantially zero.

2. The process of forming a precision resistor wherein a resistive film is deposited upon a non-conductive carrier, said process comprising the steps of forming upon said carrier a primary film comprising a field of small particles of silver, removing a portion of silver and simultaneously substituting palladium therefor by applying to said primary film a substitution bath containing a solute constituent of palladium whereby to convert said primary film of silver into an alloy field of predetermined proportions of silver and palladium, and thereafter heating said film to oxidize surface elements of said alloy field to raise the resistivity of said alloy field to a value whereat its temperature coefficient of resistance is substantially zero.

3. The process of forming a printed circuit including fixed resistances upon a non-conductive carrier which comprises forming circuit conductor elements of silver film upon said carrier, said film comprising a field of small particles of silver, removing a portion of said silver at the eventual locations of said fixed resistances in said conductor elements and simultaneously substituting therefor particles of palladium and gold by applying to said film at said locations a substitution bath containing solute constituents of palladium and gold whereby to convert said silver film into an alloy field of predetermined composition at said locations, and thereafter heating said film to oxidize surface elements of said alloy field to raise the resistivity of said alloy field to a value whereat its temperature coefficient of resistance is substantially zero.

References Cited in the file of this patent

UNITED STATES PATENTS

| | | |
|---|---|---|
| 33,721 | Liebig | Nov. 12, 1861 |
| 594,758 | Rost | Nov. 30, 1897 |
| 1,623,711 | Trimmer | Apr. 5, 1927 |
| 1,691,755 | Buttner | Nov. 13, 1928 |
| 2,281,843 | Jira | May 5, 1942 |
| 2,303,871 | Walker | Dec. 1, 1942 |
| 2,369,620 | Sullivan et al. | Feb. 13, 1945 |
| 2,454,610 | Narcus | Nov. 23, 1948 |
| 2,611,718 | Steinman | Sept. 23, 1952 |
| 2,690,402 | Crehan | Sept. 28, 1954 |

OTHER REFERENCES

Gregory: Uses and Appplications of Chemical and Related Materials, vol. 2, 1944, page 242.

Printed Circuit, NBS Circular 468, 1947, pages 21 to 28.

Draper: On the Construction of a Silvered Glass Telescope, Fifteen and a Half Inches in Aperture, and Its Use in Celestial Photography, pages 2 to 6, in Smithsonian Contributions to Knowledge, vol. XXXIV, 1907.

Printed Circuit, NBS Circular 192, Nov. 22, 1948, pages 25, 26, 37 and 38.